J. CLARKE.
TWINE REELS.
No. 181,247. Patented Aug. 22, 1876.
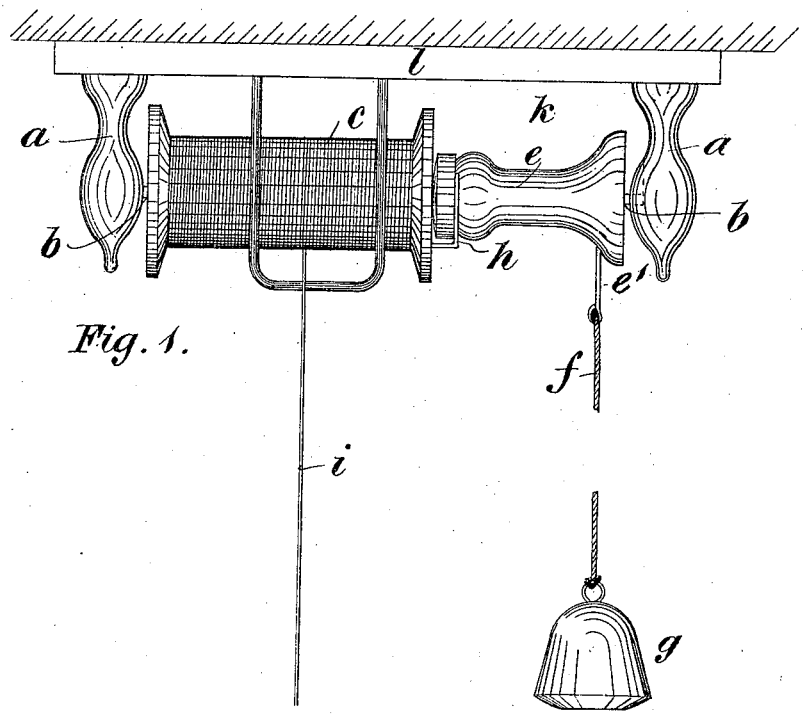
Fig. 1.
Fig. 2.
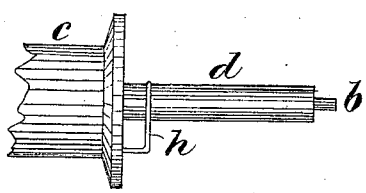
Fig. 3.
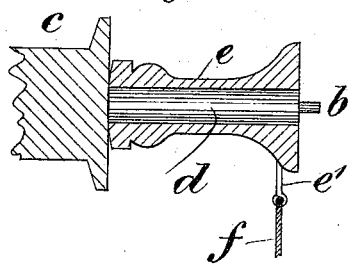
Witnesses
Charles G. Simpson
E. L. Stilwell
Inventor
James Clarke

UNITED STATES PATENT OFFICE.

JAMES CLARKE, OF MONTREAL, QUEBEC, CANADA.

IMPROVEMENT IN TWINE-REELS.

Specification forming part of Letters Patent No. 181,247, dated August 22, 1876; application filed May 18, 1876.

*To all whom it may concern:*

Be it known that I, JAMES CLARKE, of the city and district of Montreal, Province of Quebec, Canada, have invented certain new and useful Improvements on String, Thread, and Twine Reels; and I do hereby declare that the following is a full, clear, and exact description of the same.

This invention, although suitable for many varieties of string, thread, or twine reels, is more particularly adapted to those attached to the ceilings, &c., of shops or stores where goods are being sold packed up in paper parcels, and secured with twine. Here the reel is situated over the counter, and the end of the twine is left hanging down for use in tying up the parcels, and, for the purpose of economy of twine, the end is taken and applied to the parcel, wrapped around it in the manner desired, and tied, after which the twine is severed, leaving the end of the twine on the reel hanging down as before; but in the act of tying up the parcel, unless the person who does this is both skilled and careful, it will be necessary to draw down more twine than is actually required for the parcel, and thus leave the end hanging down with a portion resting upon the counter. This loose end is apt to become entangled, and in a degree obstruct the further business being done upon the counter until it is again required.

The object of my invention is, by a simple arrangement of the reel, to cause it to revolve a few turns the opposite way after any desired amount has been drawn down off it together with the ordinary non-required amount, so that it will wind up a portion of the part that has been pulled down, and leave the extreme end at a suitable height above the counter, and at a suitable height for being reached by the salesman, and not only this, but to arrange the parts so that the drawing off of any amount of twine from the reel, will not be obstructed by the rewinding arrangement.

In the drawings hereunto annexed, similar letters of reference indicate like parts.

Figure 1 is an elevation embodying my invention. Fig. 2 is a detail of Fig. 1. Fig. 3 is a detail of Fig. 1.

Letters $a$ are brackets attached to a board attached to the ceiling, or the brackets may, if desired, be attached direct to the ceiling. These are constructed, as in ordinary use, for holding twine-reels, and receive, in the ordinary manner, the ends $b$ of the axle of the twine-reel $c$. The twine-reel $c$ has at one end an extended axle or spindle, $d$, concentric, and preferably made in one with it. In this spindle $d$ one of the ends $b$ is inserted. Upon the spindle $d$ is placed a bobbin or reel, $e$, provided with a projection, $e'$, to which, by a cord, $f$, is attached a weight, $g$. $h$ is a spring or friction attached to the reel $c$, and acting upon the reel $e$, giving sufficient friction, so that when the end $i$ of the twine is pulled down, causing the reel $c$ to revolve, the friction causes the reel $e$ to revolve with it, thereby winding up the cord $f$ and weight $g$. The space $k$ not being sufficient to allow the weight $g$ to pass between the reel $e$ and the board $l$, the weight cannot come any farther; or, for the purpose of stopping the weight, a stop may be provided on the bracket $a$ on that side, preventing the weight from rising higher than the reel $e$.

If more string is required to be drawn off the reel $c$ than the length of the cord $f$ will allow, the friction $h$ yields to the pull on the end $i$, and allows it to be taken freely from the reel $c$. As soon as the end $i$ is released, the weight $g$ and cord $f$ cause the reels $c$ and $e$ to revolve the reverse way, thereby winding up a portion of the end $i$ hanging down.

The amount of the portion so wound up will be in proportion to the length of the cord $f$ and the diameter of the reel $e$, compared with the diameter of the reel $c$.

The projection $e'$ is for the purpose of causing the weight to have an amount of leverage over the reel $e$, and preventing it from turning too far, and thus, by its momentum, rewind up the weight in the opposite direction.

With regard to the friction $h$, although a spring is shown in the drawings, the friction may be obtained in a variety of ways.

As example of a few, it may be obtained by an adjusted fit of the reel $e$ upon the spindle $d$, or a friction-cramp attached to the end of the spindle $d$, and acting on the end of the reel $e$, it only being necessary to obtain a friction a little more than sufficient to wind up the cord $f$ upon the reel $e$, and lift the weight $g$.

What I claim as my invention is—

The combination of the reel $c$ and reel $e$, friction-spring $h$, and cord and weight $f$ and $g$, substantially as and for the purposes described.

Montreal, 15th day of May, A. D. 1876.

JAMES CLARKE.

Witnesses:
CHARLES G. C. SIMPSON,
E. L. STILWELL.